(12) United States Patent
Libler et al.

(10) Patent No.: US 6,676,361 B2
(45) Date of Patent: Jan. 13, 2004

(54) STAND FOR REMOVABLE CARGO BOX FOR A DUMP VEHICLE

(75) Inventors: Ryan C. Libler, Anderson, IN (US); Gary Allen Vandenbark, Markleville, IN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/100,315

(22) Filed: Mar. 14, 2002

(65) Prior Publication Data
US 2002/0190565 A1 Dec. 19, 2002

Related U.S. Application Data
(60) Provisional application No. 60/299,252, filed on Jun. 19, 2001.

(51) Int. Cl.⁷ .................................................. B60P 1/64
(52) U.S. Cl. ................ 414/498; 298/17 B; 298/17 SG; 298/17 T; 298/22 P
(58) Field of Search .......................... 298/17 B, 17 SG, 298/17 T, 1 A, 1 C; 414/498; 248/354.1, 354.5, 354.6

(56) References Cited

U.S. PATENT DOCUMENTS

| 2,527,369 A | * | 10/1950 | Meyer |
| 2,570,334 A | * | 10/1951 | Erjavec |
| 2,665,938 A | * | 1/1954 | McCrossen |
| 3,096,894 A | * | 7/1963 | Proler et al. |
| 3,145,008 A | * | 8/1964 | Herpich et al. |
| 3,362,552 A | * | 1/1968 | Thiele |
| 3,623,621 A | | 11/1971 | Tarrant et al. |
| 3,847,436 A | | 11/1974 | Reid ........................... 298/1 C |
| 3,888,467 A | * | 6/1975 | Sheets ........................ 259/148 |
| 4,523,788 A | * | 6/1985 | Prasad .......................... 298/11 |
| 5,098,019 A | * | 3/1992 | Landfeld ..................... 239/172 |
| 5,267,780 A | * | 12/1993 | Friesen et al. ............. 298/17 B |
| 5,651,655 A | * | 7/1997 | Fulbright ..................... 414/498 |
| 5,934,860 A | * | 8/1999 | Hotte |
| 2003/0053899 A1 | * | 3/2003 | Pierce |

FOREIGN PATENT DOCUMENTS

| DE | 1180320 | 10/1964 |
| FR | 1415320 | 10/1965 |
| GB | 981395 | 1/1965 |

* cited by examiner

Primary Examiner—Stephen T. Gordon

(57) ABSTRACT

A stand for a removable cargo box of a dump vehicle and a method for removing the box from a tractor. The stand has left and right mirror image legs each including a support member and a base to hold the support member upright. A cargo box attachment member is pivotally mounted to the support member and is adapted to attach to the cargo box. A vehicle attachment member is also mounted to the support member and is adapted to be attached to the vehicle, in this case a tractor, to hold the leg in place relative to the tractor while removing and remounting the cargo box. A latch holds the cargo box attachment member in a fixed rotational position relative to the support member. A method of removing the cargo box from the tractor is also disclosed.

8 Claims, 7 Drawing Sheets

STAND FOR REMOVABLE CARGO BOX FOR A DUMP VEHICLE

This application claims the benefit of U.S. Provisional Application No. 60/299,252, filed Jun. 19, 2001.

FIELD OF THE INVENTION

The present invention relates to a utility transport tractor that combines with an agricultural tractor the capability to transport materials and in particular to a stand for supporting a removable cargo box and method for removing and remounting the cargo box.

BACKGROUND OF THE INVENTION

Agricultural tractors are designed primarily to supply power to agricultural implements and to produce a continuous draft force in the direction of travel to enable soil engaging implements to perform their intended functions. Agricultural tractors must be designed with sufficient downward force acting on the drive wheels to produce the desired draft force. Often this results in a vehicle having drive wheels that are larger than the non-drive wheels to accommodate the large downward force on the drive wheels. Agricultural tractors differ from cargo carrying vehicles such as trucks in that trucks do not need to produce a continuous draft load. A truck only needs to produce a draft load when pulling a load during periods of acceleration and deceleration.

An agricultural tractor, designed primarily to produce a draft load, has limited, if any, ability to carry cargo. A farmer must use a truck or a wagon hitched to a tractor to haul cargo. Other cargo hauling utility vehicles, such as a John Deere Gator® utility vehicle can also be used. Trucks and utility vehicles, however, have shortcomings when working with agricultural implements. They do not have the tractive ability of an agricultural tractor and are generally not equipped with a three-point hitch. In small farm operations where it is not practical to buy several pieces of equipment, it is beneficial to have a utility transport tractor that combines the typical features of an agricultural tractor with the capability to carry cargo. Past attempts to combine tractors and trucks have focused on adding a three-point hitch to a truck. These products suffer from poor performance in pulling an implement and often lack visibility typical of a tractor, especially visibility of the hitch.

The utility transport tractors have been developed that modify an agricultural tractor to add a cargo box while maintaining the typical features of an agricultural tractor that provide for the continuous draft force and include a three-point hitch for pulling an implement. At times, however, an operator will desire to operate the vehicle without the cargo box. While a cargo box can be removably mounted to the tractor, a convenient means of handling the cargo box during removal and mounting and for storage of the cargo box after removal is still needed.

SUMMARY OF THE INVENTION

The present invention provides a cargo box stand to mount the cargo box on when removing the cargo box from the tractor and a method for using the stand. The stand consists of separate left and right legs that are left and right mirror images of one another. Each leg includes a support member having a base to hold the support member in an upright position. A cargo box attachment member is pivotally mounted to the support member for rotation about a pivot and is adapted to attach to the cargo box. A vehicle attachment member is also mounted to the support member and is adapted to be attached to the vehicle, in this case a tractor, to hold the leg in place relative to the tractor while removing and remounting the cargo box. A latch holds the cargo box attachment member in a fixed rotational position relative to the support member.

Removal of the cargo box begins by first attaching the legs to the respective left and right frame rails of the cargo box by the cargo box attachment members and subsequently attaching the legs to the tractor frame by the vehicle attachment members respectively. The cargo box is then detached from the tractor frame at the cargo box pivot point afterwhich the box is raised to a tilted position by using the lift cylinders normally used for raising the cargo box. When the pivot box reaches an inclined position necessary to clear various components on the tractor, the legs lock the box attachment member to the support member with the box in the inclined position. The lift cylinders are subsequently uncoupled from the cargo box and the vehicle attachment member is uncoupled from the tractor. At this point, the cargo box is supported solely on the legs and the tractor can be moved forward away from the cargo box. The cargo box is later remounted to the tractor by reversing the above steps.

DESCRIPTION OF THE PREFERRED EMBODIMENT

Figure 1:
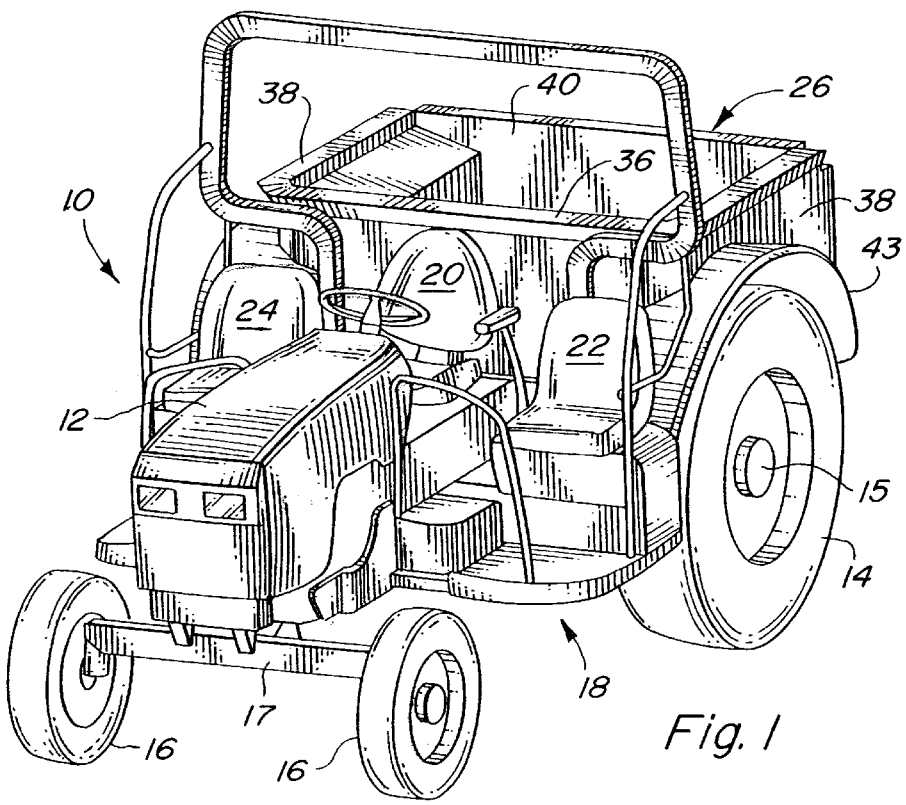
FIG. 1 is a perspective view of the utility transport tractor of the present invention.

With reference to FIG. 1, the utility transport tractor with which the stand of the present invention is used is shown and designated generally at 10. The tractor 10 has a front hood 12 covering an engine, rear drive wheels 14 on a rear axle 15 and drive wheels 16 on an axle 17, all part of a tractor chassis 19. The front wheels 16 can be driven or non-driven. An operator's station 18 is located forward of the rear wheels and includes a center operator's seat 20 and left and right passenger seats 22, 24. A cargo box 26 is located rearward of the operator's station and generally above the rear axle and rear wheels. A three-point hitch 28 (FIG. 2) is mounted behind the rear axle and beneath the cargo box 26. The three-point hitch includes a pair of lower draft links 30 and an upper link 32 in a conventional manner for a three-point hitch.

The cargo box 26 has a generally horizontal floor 34, an upright front wall 36, left and right side walls 38 and a tailgate 40. The cargo box side walls form wheel wells for the rear wheels with a portion of the cargo box being disposed above each rear wheel. Fenders 43 are attached to the tractor chassis and are shaped to fit partially within the wheel wells. The cargo box has a pair of rails 108 made of metal. The floor 34 and the bottom portions 45 of the side walls are also made of metal. The upper portions 47 of the side walls, the front wall and the tailgate are molded of plastic. The plastic panels resist dents and are molded with color to avoid the need to be painted.

The tractor 10 has a pair of frame rails 50 extending lengthwise of the tractor in the rear portion of the tractor.

The frame rails include rear pivot mounting bosses 52 adjacent to the rear of the frame rails 50. Hydraulic lift cylinders 54 are coupled to the frame rails 50 through mounting brackets 56 and 58. The lift cylinders 54 extend to raise the cargo box 26 from its horizontal position to an inclined dump position in a well known manner. The lift cylinders are attached to mounting bosses 60 fastened to the cargo box rails 108. Likewise, the cargo box carries pivot mounting bosses 62 to pivotally mount the cargo box to the pivot mounting bosses 52 of the tractor frame. Removable pivot pins 64 are used to attach the cargo box at the pivotal mount. Similar pivot pins (not shown) are used to attach the lift cylinders 54 to the cargo box.

Figure 4:
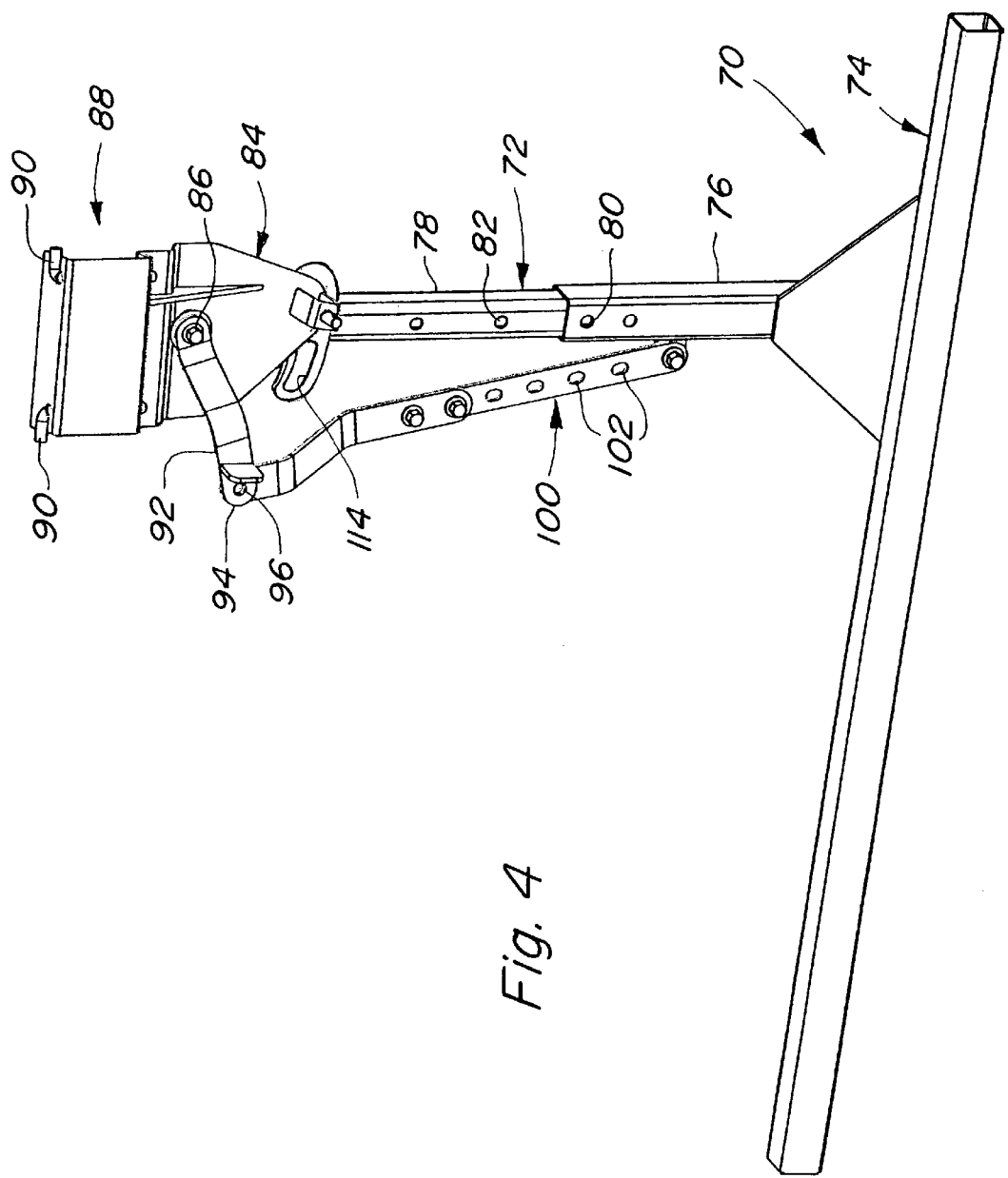
FIG. 4 is a perspective view of one leg of the stand.

The right hand leg of the bed stand is shown in FIG. 4 and designated generally as 70. The leg 70 has an support member 72 coupled to a base 74 to hold the support member 72 in an upright orientation. The support member 72 is of a two piece construction, having a lower portion 76 and an upper portion 78 coupled together by a bolt (not shown) extending through aligned apertures 80 and 82. The two piece construction enables the height of the support member to be adjusted.

A cargo box attachment member 84 is pivotally mounted to the upright support member 72 about a pivot pin 86 at the upper end of the support member 72. An upper portion 88 of the box attachment member 84 is shaped as an open "C-shaped" channel that receives the frame rail 108 of the cargo box as described below. A pair of pins 90 are inserted vertically through the "C-shaped" proportion 88 and through the cargo box rails to couple the cargo box attachment member to the cargo box rails.

The leg 70 also includes a vehicle attachment member 92 fastened to the support member 72 by the pivot pin 86 and extending outward to a distal end 94. The distal end has an aperture 96 through which the vehicle attachment member is attached to the tractor 10 by a pin or bolt (not shown) extending through the aperture 96 and through the aperture 98 at the rear of the tractor frame rails 50. A two piece brace 100 extends from the distal end of the vehicle attachment member 92 and downward to the upright support member 72 to provide additional stability to the leg when mounting and removing the cargo box to and from the tractor 10. The brace 100 is also of a two piece construction to enable the length of the brace to be adjusted. The apertures 102 in the lower piece of the brace are slightly elongated to assist in adjusting the length of the brace 100.

A spring biased latch pin 110 is carried by the box attachment member 84 and is biased against a latch plate 112. The latch plate 112 has an slot 114 at one end thereof. As the cargo box is raised to an inclined dump position, the pin 110 slides across the surface of the latch plate 112 until it reaches the slot 114 and then extends through the slot in the latch plate.

Figure 2:
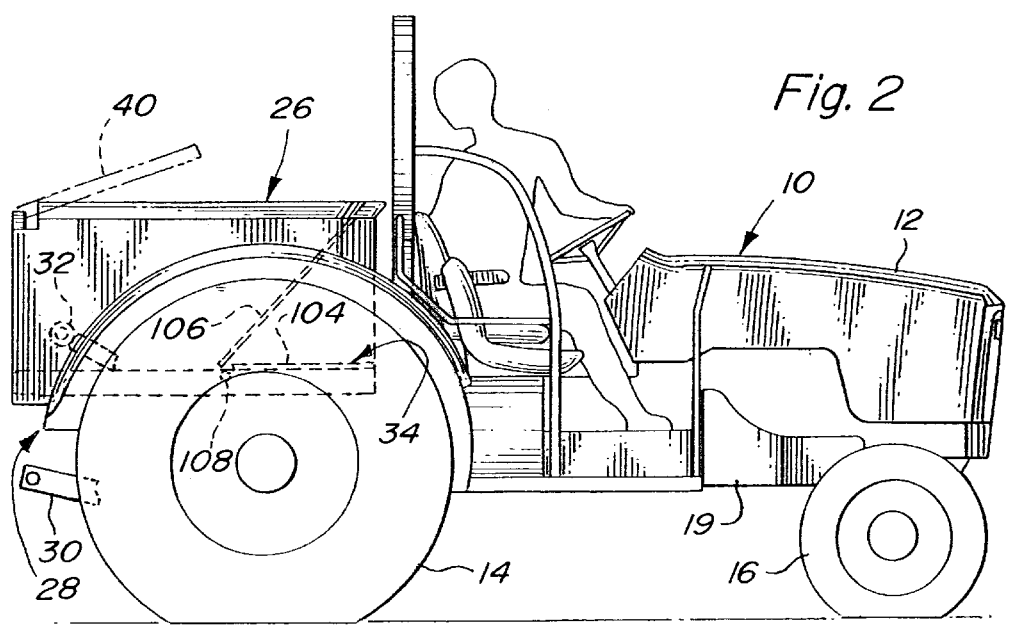
FIG. 2 is a side view of the utility transport tractor of the present invention.
Figure 3:
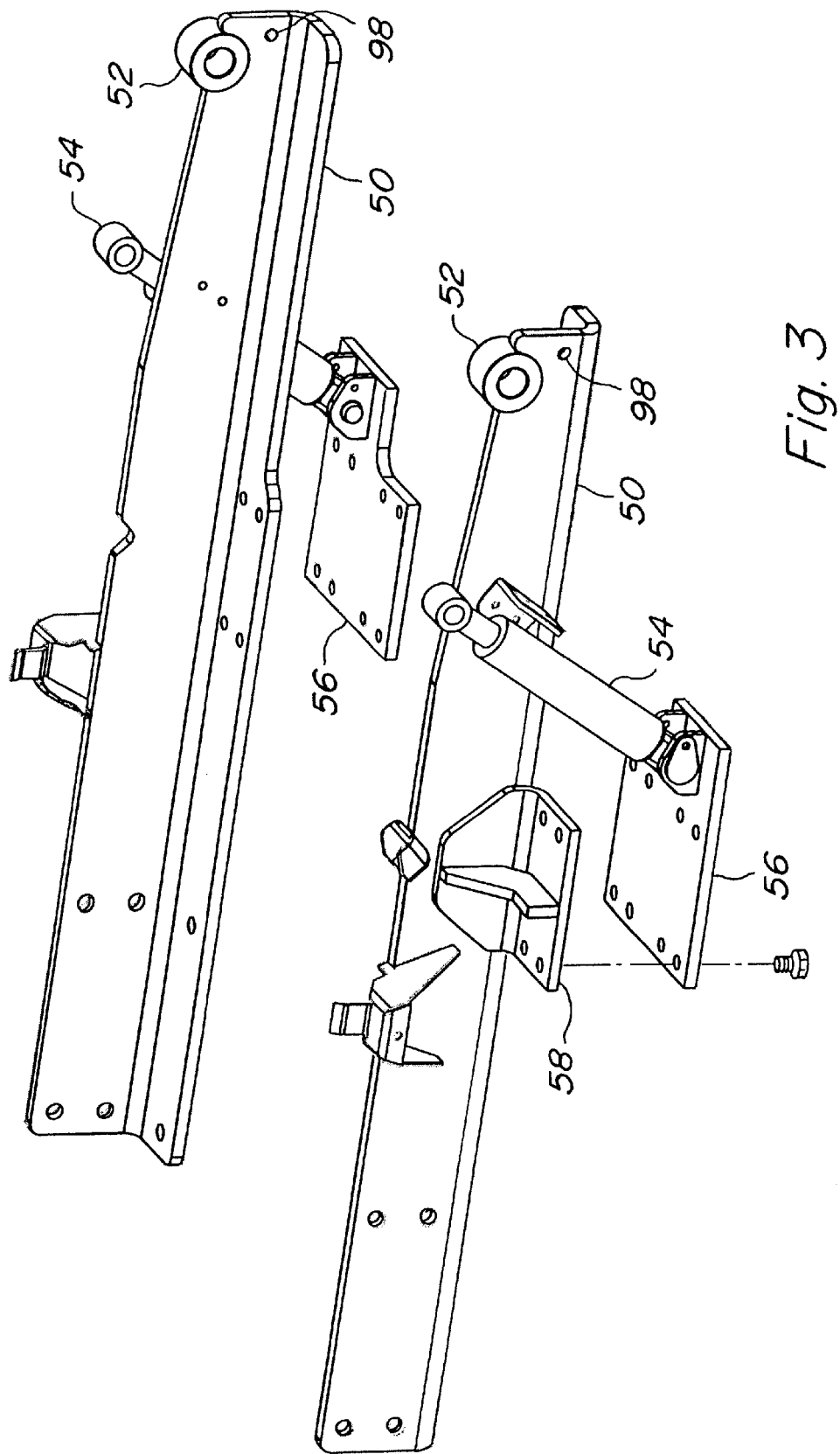
FIG. 3 is an exploded perspective view of the tractor frame rails and lift cylinders.

With reference again to FIG. 2, the floor 34 of the cargo box has a fixed front portion 104 and a rotable rear portion 106. The rear portion rotates about a laterally extending pivot axis and can be tilted forward and upward as shown in FIG. 2. Once the rear portion 106 of the cargo box floor has been rotated to the raised position, the left and right legs 70 are moved into position and coupled to the cargo box rails 108 by the pins 90. The vehicle attachment members 92 are then coupled to the two frame rails 50 of the tractor to secure the legs to the tractor.

Figure 5:
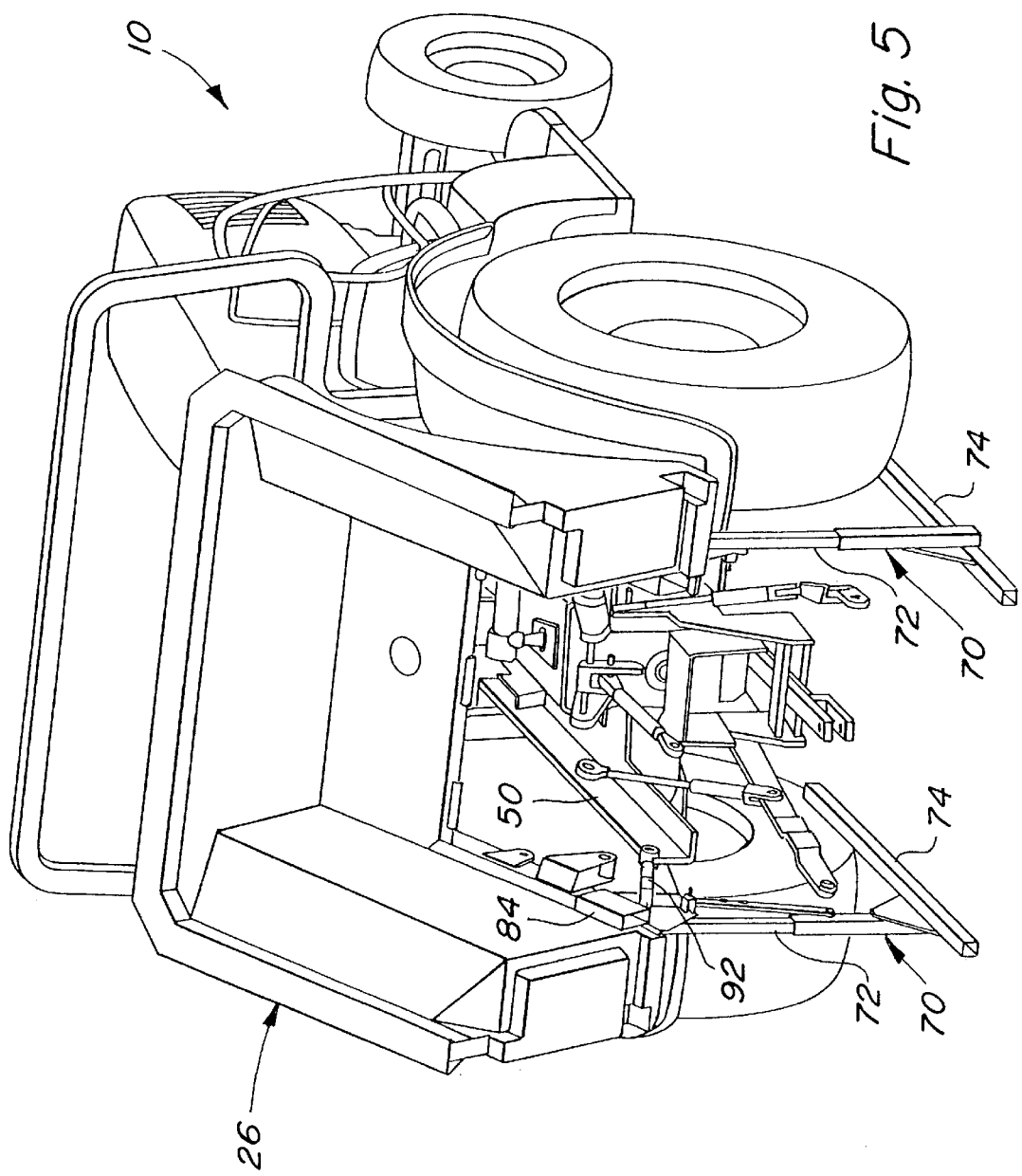
FIG. 5 is a perspective view of the tractor with the cargo box in the process of being removed.
Figure 6:
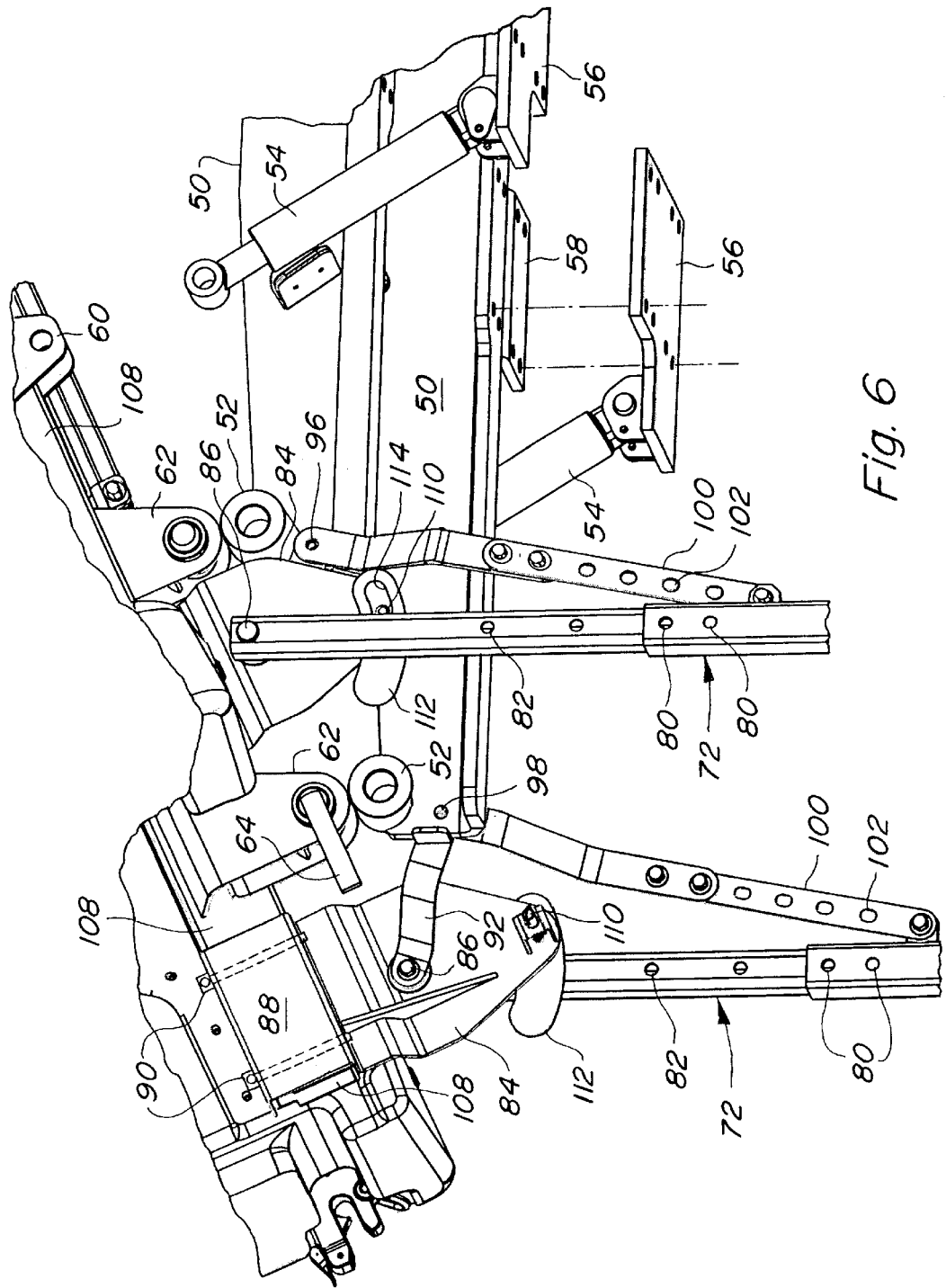
FIGS. 6 and 7 are enlarged partially exploded perspective views of the stand coupled to the cargo box and tractor during removal of the box.
Figure 7:
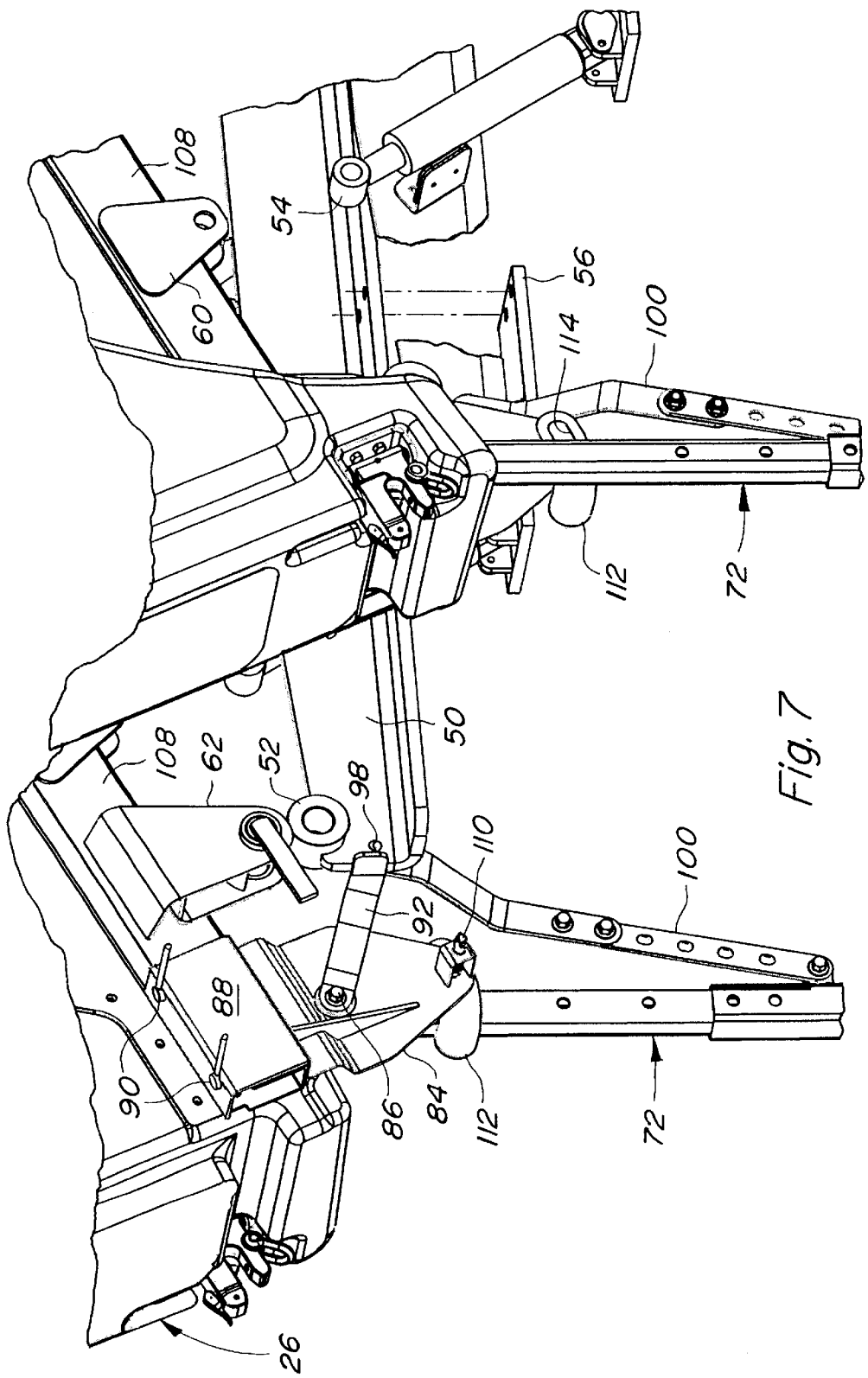
Figure 8:
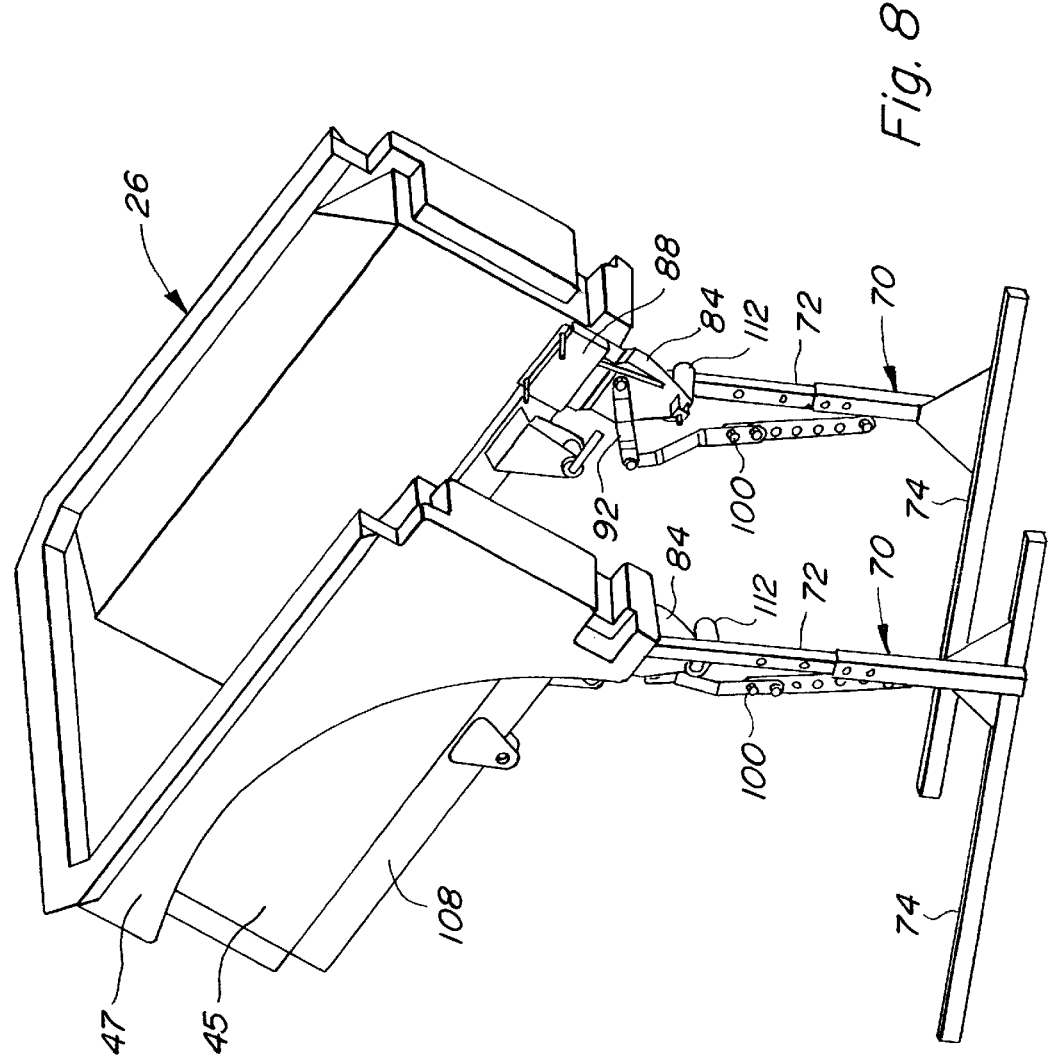
FIG. 8 is a perspective view of the box mounted on the stand of the present invention.

The cargo box pivot pins 64 are removed so that the cargo box id only coupled to the tractor through the lift cylinders 54. The cylinders 54 are then extended to raise the cargo box to the inclined position shown in FIG. 5 until the latch pins 110 reach the slots 114 and extend through the slots. The cylinders 54 are then slightly retracted until the pins 110 rest on the ends of the slots 114. The load acting through the attachments of the lift cylinders is thus relieved, enabling the cylinder attachment pins to be removed more easily. The cylinders are then uncoupled from the cargo box. This results in the cargo box being completely uncoupled from the tractor. The vehicle attachment members 92 are then uncoupled from the tractor frame. Once this is done, the tractor can be moved forward, away from the cargo box and the stand, leaving the cargo box supported on the stand for later remounting to the tractor. The cargo box is remounted to the tractor by reversing the above steps.

Storing the cargo box in an inclined position helps to ensure that the cargo box is free from any cargo before it is stored on the stand and prevents filling the cargo box with cargo prior to remounting the cargo box on the tractor. This minimizes the weight carried by the cargo box stand.

Having described the preferred embodiment, it will become apparent that various modifications can be made without departing from the scope of the invention as defined in the accompanying claims.

What is claimed is:

1. A stand for a removable vehicle cargo box comprising:
   a support member having a base to hold the support member in an upright position;
   a cargo box attachment member pivotally mounted to the support member for rotation about a pivot and adapted to be attached to a cargo box;
   a vehicle attachment member mounted to the support member and adapted to be attached to the vehicle to hold the stand in place relative to the vehicle while removing the cargo box from the vehicle;
   a latch to hold the cargo box attachment member in a fixed rotational position relative to the support member.

2. The stand as defined by claim 1 wherein the vehicle attachment member is coupled to the support member at the pivot.

3. The stand as defined by claim 1 further comprising a brace extending from a distal end of the vehicle attachment member to the support member.

4. The stand as defined by claim 1 wherein the box attachment member has a "C-shaped" portion adapted to fit over a cargo box frame rail and attach thereto.

5. Left and right stands for a removable vehicle cargo box comprising for each stand:
   a support member having a base to hold the support member in an upright position;
   a cargo box attachment member pivotally mounted to the support member for rotation about a pivot and adapted to be attached to a cargo box;
   a vehicle attachment member mounted to the support member and adapted to be attached to the vehicle to hold the stand in place relative to the vehicle while removing the cargo box from the vehicle;
   a latch to hold the cargo box attachment member in a fixed rotational position relative to the support member; and
   the left and right stands being left and right mirror images of one another.

6. The stand as defined by claim 5 wherein the vehicle attachment member is coupled to the support member at the pivot.

7. The stand as defined by claim 5 further comprising a brace extending from a distal end of the vehicle attachment member to the support member.

8. The stand as defined by claim 5 wherein the box attachment member has a "C-shaped" portion adapted to fit over a cargo box frame rail and attach thereto.

* * * * *